(12) United States Patent
Giannetti (10) Patent No.: US 9,448,752 B2
(45) Date of Patent: Sep. 20, 2016

(54) PRINT SERVICE IDENTIFIER

(75) Inventor: Fabio Giannetti, Los Gatos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/420,044

(22) PCT Filed: Aug. 7, 2012

(86) PCT No.: PCT/US2012/049846
§ 371 (c)(1),
(2), (4) Date: Feb. 6, 2015

(87) PCT Pub. No.: WO2014/025341
PCT Pub. Date: Feb. 13, 2014

(65) Prior Publication Data
US 2015/0169261 A1    Jun. 18, 2015

(51) Int. Cl.
*G06F 3/12*    (2006.01)
(52) U.S. Cl.
CPC ............ *G06F 3/126* (2013.01); *G06F 3/1204* (2013.01); *G06F 3/1232* (2013.01); *G06F 3/1272* (2013.01); *G06F 3/1287* (2013.01); *G06F 3/1288* (2013.01); *G06F 3/1291* (2013.01); *G06F 3/1208* (2013.01); *G06F 3/1244* (2013.01)

(58) Field of Classification Search
CPC .... G06F 3/126; G06F 3/1291; G06F 3/1204; G06F 3/1272; G06F 3/1232; G06F 3/1287; G06F 3/1288; G06F 3/1208; G06F 3/1244
USPC .............................................. 358/1.15, 1.16
See application file for complete search history.

(56) References Cited

U.S. PATENT DOCUMENTS

| | | |
|---|---|---|
| 6,981,015 B1 | 12/2005 | Palmer |
| 7,042,585 B1 | 5/2006 | Whitmarsh |
| 7,796,283 B2 | 9/2010 | Field |
| 8,079,582 B2 | 12/2011 | Reichhart |
| 8,189,220 B2 | 5/2012 | Subramanian |
| 2003/0182475 A1 | 9/2003 | Gimenez |
| 2003/0218770 A1* | 11/2003 | Field .............. G06Q 10/063116 358/1.15 |
| 2005/0138065 A1 | 6/2005 | Ciriza |
| 2008/0243285 A1 | 10/2008 | Reichhart |
| 2008/0259379 A1* | 10/2008 | Shepherd ..................... 358/1.15 |
| 2009/0076905 A1 | 3/2009 | Kraft et al. |
| 2009/0185216 A1 | 7/2009 | Reichhart |
| 2009/0292624 A1 | 11/2009 | Mirmotahari |
| 2009/0319460 A1 | 12/2009 | Reichhart |
| 2011/0022209 A1 | 1/2011 | Ocke |

OTHER PUBLICATIONS

Albanese et al., Drop2Print: A Model for PDF-Specifications to Drive the Discovery of Print Service Providers, Printing Industry Center, 2011, 30 pages.

(Continued)

*Primary Examiner* — Kent Yip
(74) *Attorney, Agent, or Firm* — Dicke, Billig & Czaja, PLLC (PAT)

(57) ABSTRACT

A system for identifying a print service provider including an input module to receive a requested print product intent and an identification module. The identification module collects production job data regarding a plurality of successfully produced print jobs and compares the collected production job data to the requested print product intent to identify matching print jobs and its associated print service provider. A reporting module reports the matching print jobs.

19 Claims, 6 Drawing Sheets

(56) References Cited

OTHER PUBLICATIONS

Bar-Shany, Digital Printing for Consumer Packaged Goods Companies, Jan. 19, 2010, 1 page.
Corr, To Find the Right Print Service Provider Just Drop2Print, printed from http://blog.infotrends.com/?p=5163, Sep. 6, 2011, 5 pages.
Esko, Suite 12, printed from www.esko.com/en/company/press-and-news/press-releases/2012/drupa-suite12, 2012, 3 pages.
Hiflex, Office Package, printed from www.hiflex.com/hiflex, Aug. 2012, 8 pages.
JDF Marketplace, The Industry's Resource for JDF-Enabled Products and Services, CIP4 Organization, May 2012, 161 pages.

* cited by examiner

PRINT SERVICE IDENTIFIER

BACKGROUND

Buyers of printing services enjoy the option of having their products produced by analog printers or by digital printers, and sometimes by both types of printers. Nevertheless, some types of products tend to be printed via one type of printing over another due to existing relationships, cost, or other reasons.

DETAILED DESCRIPTION

In the following detailed description, reference is made to the accompanying drawings which form a part hereof, and in which is shown by way of illustration specific examples of the present disclosure which may be practiced. In this regard, directional terminology, such as "top," "bottom," "front," "back," "leading," "trailing," etc., is used with reference to the orientation of the Figure(s) being described. Because components of examples can be positioned in a number of different orientations, the directional terminology is used for purposes of illustration and is in no way limiting. It is to be understood that other examples may be utilized and structural or logical changes may be made without departing from the scope of the present disclosure. The following detailed description, therefore, is not to be taken in a limiting sense.

Upon a print buyer submitting a request, via a user interface, for bids to produce a print product, at least some examples of the present disclosure automatically identify and display (via the user interface) a list of print service providers that are well suited to produce the requested print product. The print buyer then selects one of the print service providers to perform their print job according to the submitted print product request. In this way, print buyers are quickly and efficiently matched with print service providers that are competent to produce the requested print products, thereby enabling the print buyers to bypass the cumbersome traditional manner of approaching different printing firms regarding whether they can handle a particular job and the inefficient and costly way in which the print buyer is forced to evaluate the particular printing firms. Accordingly, the print buyer is freed to efficiently and effectively exploit the dynamic variety of printing services available, including digital printing services.

In one example, a system for identifying a print service provider includes an input module to receive a request for a print product intent and an identification module. In some instances, the request is referred to as a print product intent, and includes information such as a number of copies, general size of product, type of binding, type of cover, type of media, color quality, etc. There are no strict rules about what information is included in a print product intent, so the level of detail about what is requested can vary greatly among different print product intents submitted by print buyers. In one example, a print product intent is expressed according to a product intent feature of a Job Definition Format (JDF) protocol.

In one aspect, the identification module collects production job data regarding a plurality of successfully produced print jobs and compares the collected production job data to the requested print product intent to identify matching print jobs and its associated print service provider. A reporting module reports the matching print jobs. In one example, the production job data is at least partially expressed as Job Definition Format (JDF) processes.

In a further example, the identification module translates the Job Definition Format processes (associated with the collected production job data) into a corresponding Job Definition Format (JDF) intent model, and compares the Job Definition Format intent models with the requested print product intent to determine which intent models most closely match the requested print product intent. Because each intent model is based on a print job (including at least one Job Definition Format (JDF) process) that was successfully performed, the system ensures that any intent model selected by the print buyer is within the competence of the print service provider associated with the intent model.

In one example, the identification module is operated or hosted by an identifier service provider who builds a library of intent models so that upon receipt of a requested print product intent, the identification module is able to quickly compare the print product intent with the available intent models to identify a closest matching intent model. Because each intent model is associated with a particular print service provider that successfully performed a print job on which the intent model was based, by selecting a particular intent model the print buyer is effectively selecting a competent print service provider to perform their print product request (or print product intent).

In some examples, the identification module indicates to a print buyer which, if any, modifications to their print product intent would result in more matches or a closer match to the available intent models.

In addition to determining which Job Definition Format (JDF) processes each print service provider is performing, in at least some examples of the present disclosure, the print service identifier system tracks a quality of the work done by each print service provider, such that the system can exclude under-performing print service providers from being eligible to bid on or produce a print product intent submitted by the print buyer. Accordingly, by looking at what print service providers are actually doing, and how well they are doing it, at least some examples of the present disclosure automatically identify print service providers that are well-suited to perform a print job (as expressed via the submitted print product intent) of a print buyer. In some examples, the print product intent concerns consumer packaged goods (CPGs) and a print service provider employs a digital press to produce the consumer packaged goods defining the print product. Moreover, according to at least some examples of the present disclosure, a print service identifier system enables a print buyer to find a print service provider (employing a digital press) that is able to adapt quickly to the changing demands and conditions associated with today's consumer packaged goods.

In this way, the print buyer saves much time, money, and energy that would otherwise be spent dealing with traditional print service providers (those using analog presses and/or flexographic printing) that typically prefer longer print runs and fewer changes to the print products to be produced. Instead of the laborious traditional process, via at least some examples of the present disclosure, a print buyer is able to quickly be exposed to, and to select, potential print service providers that are able to promptly meet the quickly changing demands of the print buyer. Moreover, the print buyer is able to accomplish these goals without having to participate in direct communications and negotiations with the prospective print service providers. Finally, as noted above, via at least some examples of the present disclosure, the system ensures that the print service providers identified for consideration by the print buyer are competent to perform the requested services, thereby saving the print buyer from having to evaluate competency on top of evaluating other factors, such as pricing, availability, etc.

These examples, and additional examples, are described further in association with FIGS. 1-10.

Figure 1A:
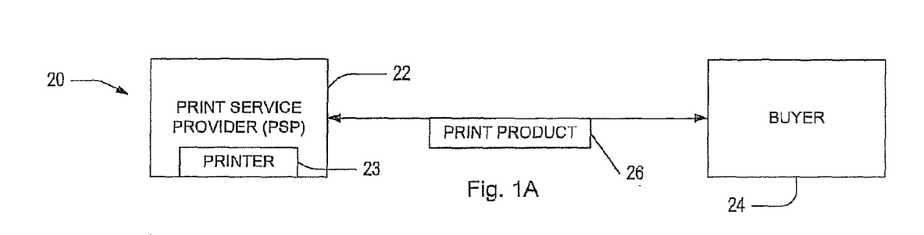
FIG. 1A is a block diagram schematically illustrating a print service environment, according to one example of the present disclosure.

FIG. 1A is a block diagram schematically illustrating a print service environment 20, according to an example of the present disclosure. As shown in FIG. 1A, print service environment 20 includes a print service provider 22, a print buyer 24, and a print product 26 to be produced by the print service provider 22.

In one example, print product 26 includes a consumer packaged good, such as a container (e.g. a box), wrapper, package, etc. for food, clothing, household products and those items that are consumed relatively frequently. Printing occurs directly on the container or packaging and/or occurs on a label affixed to the container or packaging. In some instance, printing occurs directly on the good itself. In other examples, a print product comprises a book, magazine, booklet or pamphlet. In at least some instances, the print product (whether it is a consumer packaged good or not) exhibits some three-dimensionality in form.

Figure 1B:
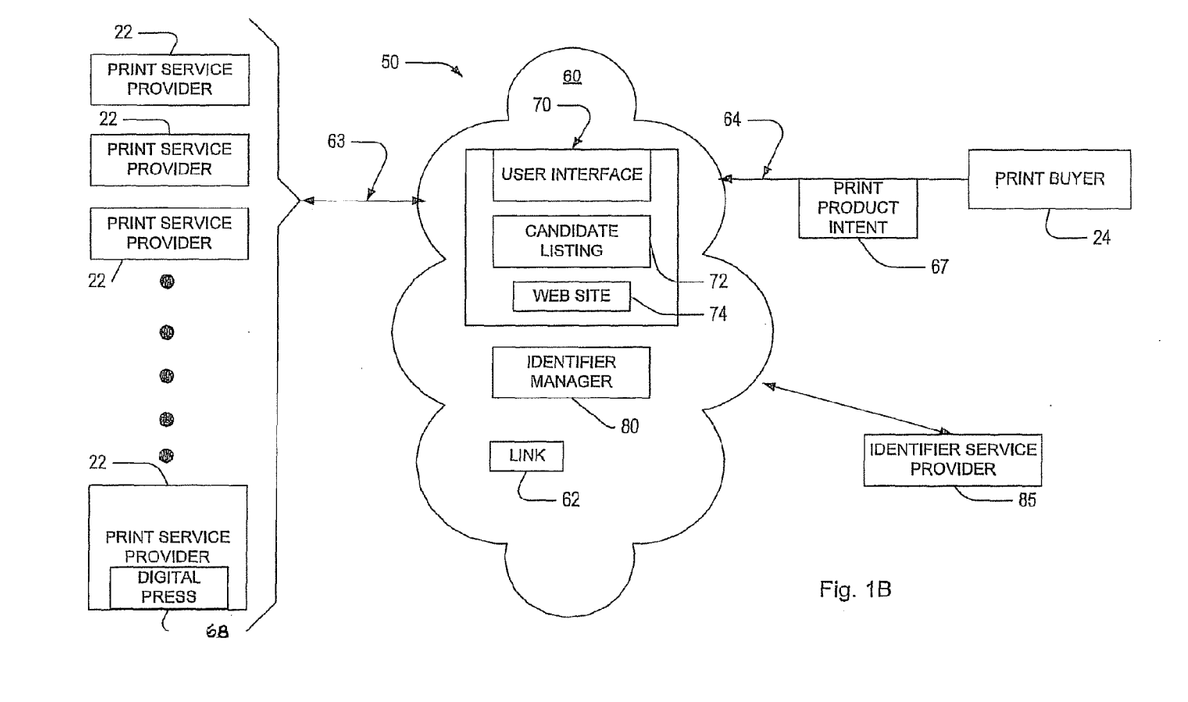
FIG. 1B is a block diagram schematically illustrating a print service identifier system, according to one example of the present disclosure.

FIG. 1B is a block diagram of a print service identifier system 50, according to one example of the present disclosure. As shown in FIG. 1B, print service provider 22 and print buyer 24 communicate with each other via cloud 60, along the respective communication paths 63, 64. In one example, the cloud 60 represents a network communication link 62 such as the internet, other network-based communication protocols, mobile telecommunication networks, local area networks (LAN), wide area networks (WAN), etc.

In one example, buyer 24 participates in system 50 via a computer (e.g. laptop, desktop, etc.), a mobile computing device (e.g. smartphone, tablet, etc.), and like devices capable of communicating via cloud 60. The buyer 24 can be an individual consumer, a business or other entity. For example, in some instances, buyer 24 is another print service provider that seeks to outsource portions of a print job (or an entire print job) for which the particular print service provider lacks the appropriate type of resources to perform and/or for which the particular print service provider does not have the capacity to handle in a particular time frame. It will be further understood that system 50 can handle multiple buyers 24 operating in parallel with each buyer 24 independently communicating with a print service provider 22 regarding their own respective purchases of print products.

In one example, the print service providers 22 include an entity owning and/or operating a print shop having printers and related devices for producing a print product requested by buyer 24. In one aspect, the print services include printing, copying, finishing, assembly, delivery, shipping and related tasks. In one aspect, at least some of the print service providers 22 operate a publically accessible portal, such as a user interface and/or web site through which the buyer 24 and a print service provider 22 can communicate with each other via the cloud 60 regarding a print product 26.

In another example, system 50 includes an identifier manager 80 that is not generally accessible by the print buyer 24 and which acts to identify print service providers 22 that are capable of meeting the printing demands of the print buyer 24. While described briefly in the context of system 50 and in association with FIG. 1B, additional features and aspects of the identifier manager 80 are further described later in association with FIGS. 2-9.

In one example, system 50 includes an identifier service provider 85 who is a third party relative to buyer 24 and relative to print service provider 22. In one aspect, identifier service provider 85 does not provide its own printing services to buyer 24. Instead, identifier service provider 85 provides and operates identifier manager 80. In general terms, via identifier manager 80, identifier service provider 85 is able to locate print service providers 22 capable of producing print products requested by print buyer 24.

With these features of system 50 in mind, it can be seen in general terms that the print buyer 24 seeks to obtain printing services from one of the many print service providers 22, such as printing of particular print products including, but not limited to, consumer packaged goods. In one example, as shown in FIG. 1B, at least some of the print service providers 22 utilize digital presses 68 to produce the print products, such as consumer packaged goods. Accordingly, via at least some examples of the present disclosure, the print service providers 22 using digital presses 68 are able to provide a quicker turnaround time at a reasonable cost because they have more flexibility and agility to meet smaller volume print jobs than traditional analog presses or flexographic printing facilities. For example, with the proliferation of stock keep units (SKUs) that form a part of the printed packaging and/or labeling typically associated with consumer packaged goods (CPGs), and the pace at which these stock keeping units are added or changed, there are more frequent changes in the print jobs that produce the overall packaging that includes these stock keeping units. Such frequent changes can be cumbersome and relatively expensive for the traditional print service providers, which tend to use analog presses and flexographic printers.

However, in at least some examples of the present disclosure, via identifier manager 80, the identifier service provider 85 identifies and sorts print service providers 22 according to the jobs they have successfully performed. Upon matching the print product intent 67 (supplied by the print buyer 24) to the specifications of the jobs (successfully performed by the print service providers 22), the identifier manager 80 (operated by the identifier service provider 85) makes recommendations to the print buyer 24 via candidate listing 72 at user interface 70 accessible to print buyer 24. Because the candidate listing 72 of recommended print service providers 22 is built according to actual jobs successfully performed by some of the print service providers 22, the identifier manager 80 ensures that the print buyer 24 will be matched with print service providers 22 that are able to competently perform print jobs according to the print product intent 67 provided by the print buyer 24.

In particular, in at least some examples of the present disclosure, these print service providers 22 employ a digital press 68, and have performed some jobs that are sufficiently similar to the desired print product or job. Accordingly, upon sorting through these successful jobs and the print service providers 22 associated with each job, the identifier manager 80 is able to produce the candidate listing 72 of print service providers 22 that would be a suitable match to perform the print job requested by the print buyer 24 according to print product intent 67.

In one example, the print product intent 67 includes the specifications describing the details of a job to print at least one print product. In one aspect, these specifications are expressed according to a Job Definition Format (JDF) protocol, established via the International Cooperation for the Integration of Processes in Prepress, Press, and Postpress Organization, commonly known as CIP4, and accessible via at least www.cip4.org.

Figure 2:
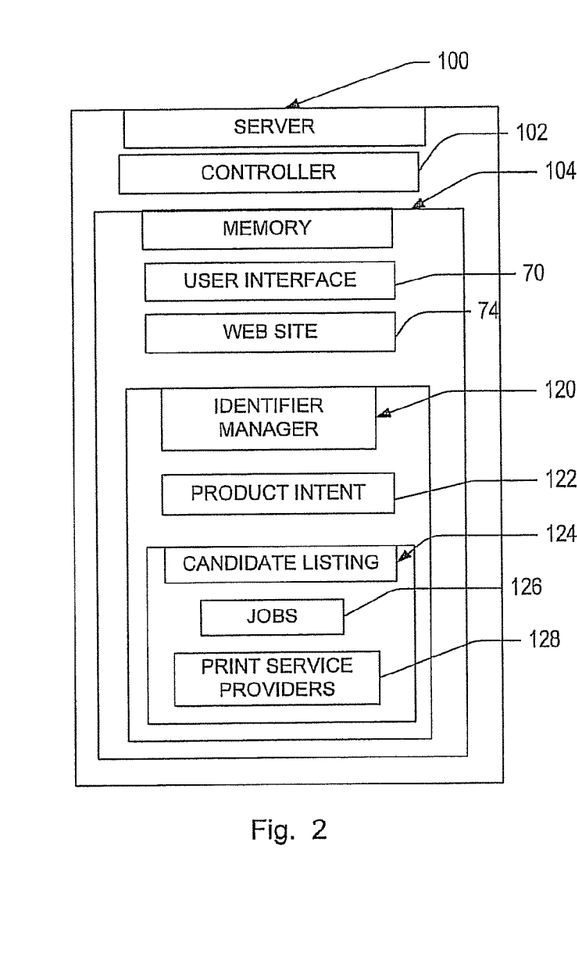
FIG. 2 is a block diagram schematically illustrating a server of a print service identifier system, according to one example of the present disclosure.

FIG. 2 is a block diagram of a server 100 associated with identifier service provider 85 (FIG. 1B), according to an example of the present disclosure. As shown in FIG. 2, in one example server 100 includes a controller 102 and memory 104. In one example, memory 104 stores user interface 70, web site 74, and an identifier manager 120. In one example, identifier manager 120 includes at least substantially the same features and attributes as identifier manager 80, as previously described and illustrated in association with FIG. 18.

In one example, controller 102 comprises at least one processor and associated memories to generate control signals directing operation of at least some components of system 50 of FIG. 1B and/or server 100 of FIG. 2. In particular, in response to or based upon commands received via a user interface (associated with identifier manager 120) and/or machine readable instructions (including software) contained in the memory 104 associated with controller 102, controller 102 generates control signals directing operation of server 100 shown in FIG. 2. In one example, controller 102 is embodied in a general purpose computer.

For purposes of this application, in reference to the controller 102, the term "processor" shall mean a presently developed or future developed processor (or processing resources) that executes sequences of machine readable instructions (such as but not limited to software) contained in a memory. Execution of the sequences of machine readable instructions causes the processor to perform actions, such as operating server 100 to provide services by identifier service provider 85 in the manner described in the examples of the present disclosure. The machine readable instructions may be loaded in a random access memory (RAM) for execution by the processor from their stored location in a read only memory (ROM), a mass storage device, or some other persistent storage or non-volatile form of memory, as represented by memory 104. In one example, memory 104 comprises a computer readable medium providing non-volatile storage of the machine readable instructions executable by a process of controller 102. In other examples, hard wired circuitry may be used in place of or in combination with machine readable instructions (including software) to implement the functions described. For example, controller 102 may be embodied as part of at least one application-specific integrated circuit (ASIC). In at least some examples, the controller 102 is not limited to any specific combination of hardware circuitry and machine readable instructions (including software), nor limited to any particular source for the machine readable instructions executed by the controller 102.

In one example, the machine readable instructions (including software) are based at least partially on Extensible Markup Language (XML) or similar object-oriented programming language. In another example, the machine readable instructions (including software) are at least partially based on the Job Definition Format (JDF) protocol.

In one example, user interface 70 comprises a graphical user interface or other display that provides for the simultaneous display, activation, and/or operation of the various components, functions, features, and modules of server 100, described in association with at least FIG. 2, and/or operation of the various components, functions, features, and modules of manager 200 or user interface 600, as later described in association with at least FIGS. 3 and 8, respectively. Moreover, it will be understood that the features, functions, modules, and components of the server 100 can be arranged in different forms and groupings, and therefore server 100 is not strictly limited to the particular arrangement or groupings of functions, modules, and components illustrated in FIG. 2. Similarly, while described later, it will be further understood that the features, functions, modules, and components of the example manager 200 (FIG. 3) and/or example user interface 600 (FIG. 8) can be arranged in different forms and groupings, and therefore each of manager 200 or user interface 600 are not strictly limited to the particular arrangement or groupings of functions illustrated in FIGS. 3 and 8, respectively.

With reference to FIGS. 1B and 2, in one example web site 74 comprises a site operated by identifier service provider 85 and accessible by at least print buyer 24, through which user interface 70 can be accessed. However, in other examples, user interface 70 is supplied via CD-ROM or communication protocols and/or environments other than web site 74.

While in one example the features, function, modules, and/or components of an identifier service provider 85 are at least partially embodied in a server (e.g. server 100) as described in association with FIG. 2, it will be understood that in another example of the present disclosure, at least some of the features, functions, modules, and/or components of the identifier service provider 85 and/or the print service providers 22 are provided via the cloud 60 via cloud computing resources provided via: (1) infrastructure as a service (IaaS); (2) platform as a service (PaaS); (3) software as a service (SaaS); or (4) a hybrid form of cloud-based services.

With further reference to FIGS. 1B and 2, in one example, print service provider 22 contracts with identifier service provider 85 to be eligible for consideration for placement on candidate listing 72 in user interface 70. In one example, the identifier service provider 85 prepares the candidate listing 72 without any communication with the print service providers 22 directly related to the information being tracked and/or related to the potential listing of the print service provider 22 on candidate listing 72.

As shown in FIG. 2, in one example, identifier manager 120 is stored within memory 104 and includes a product intent function 122 and a candidate listing function 124. In general terms, via product intent function 122 the identifier manager 120 learns the print product intent 67 (FIG. 1B) requested by print buyer 24. Upon tracking the behavior of the print service provider 22 in a manner further described later, the candidate listing function 123 of the identifier manager 120 produces a candidate listing (e.g. candidate listing 72 in FIG. 1B) according to at least one of a jobs parameter 126 and a print service provider parameter 128. Via the jobs parameter 126, the candidate listing 72 reveals jobs that are generally similar to the print product intent 67 (FIG. 1B) submitted by print buyer 24 and that were successfully performed. This candidate listing enables a print buyer 24 to sort through the jobs and upon finding those jobs most similar to the print product intent 67 (FIG. 1B), identify a print service provider 22 capable of performing a job according to the print product intent 67.

Via the print service provider parameter 128, the candidate listing function 124 provides a list of print service providers 22 that have successfully performed jobs similar to the print product intent 67. For each listed print service provider 22, the candidate listing 72 includes information about at least one job successfully performed by that print service provider 22 that is pertinent to the print product intent 67 provided by print buyer 24.

In one example, instead of the print buyer 24 sorting through the candidate listing produced by listing function 124, the identifier manager 80 automatically sorts and ranks the candidate jobs (via jobs parameter 126) or the candidate print service providers (via printer service provider parameter 128) to provide the print buyer 24 with a recommendation of which job is the closest match to the print product intent 67 and/or which print service provider 22 is the best provider to choose to produce their print product intent 67.

Further details regarding operation of the identifier manager 120 are described in association with at least FIGS. 3-9.

Figure 3:
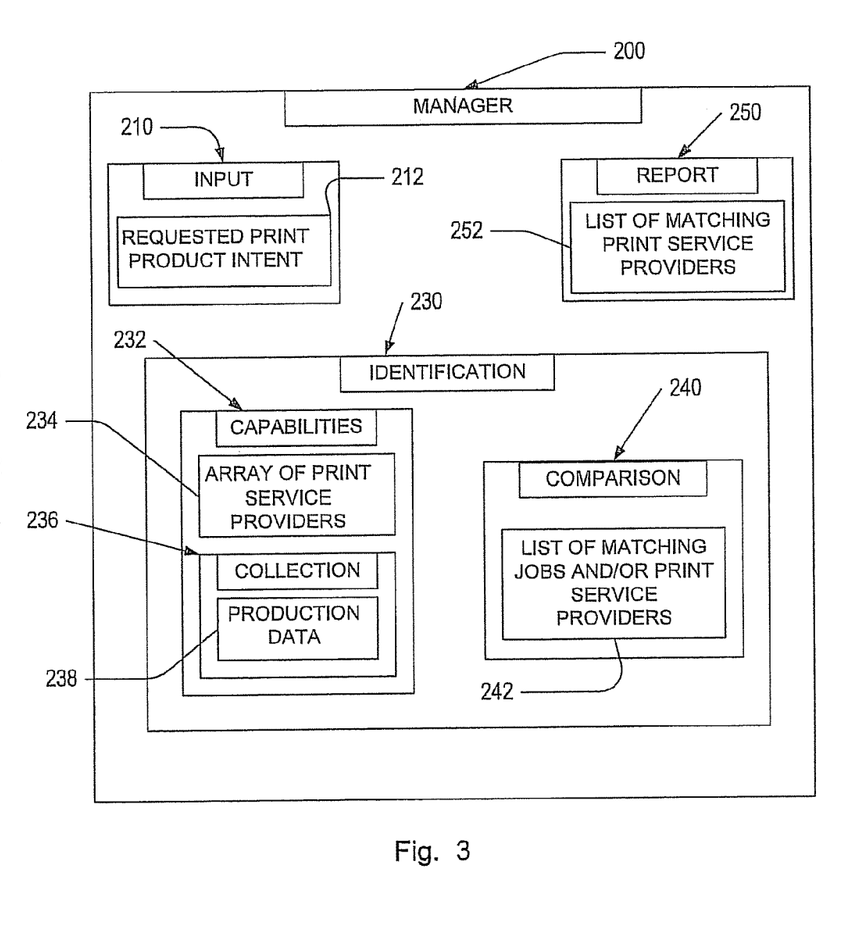
FIG. 3 is a block diagram schematically illustrating a manager of a printing service identifier system, according to one example of the present disclosure.

FIG. 3 is a block diagram of an identifier manager 200, according to one example of the present disclosure. In one example, identifier manager 200 includes at least substantially the same features and attributes as identifier manager 80 and 120, as previously described and illustrated in association with FIGS. 1B and 2.

As shown in FIG. 3, identifier manager 200 includes an input module 210, an identification module 230, and a reporting module 250. In one example, the input module 210 receives the requested print product intent 212 (like print product intent 67 in FIG. 1B) from a print buyer 24, such as via user interface 70 at web site 74 or other avenues.

In one example, the identification module 230 includes a capabilities function 232 and a comparison function 240. In general terms, the capabilities function 232 automatically determines which print jobs each print service provider 22, in an array 234 of print service providers 22, has performed (including successes and unsuccessful attempts) and the detailed specifications associated with each job.

In one example, the capabilities function 232 further includes a collection function 236 that automatically collects data from each production job performed by the print service providers in array 234. This data can include, but is not limited to, the type and quantity of each machine used, the sequence of tasks, time to complete each task, the quality level to which each task was performed, the type and quantity of media, the type and volume of ink, the type and quantity of presses, the type of pre-press activity, the type and quantity of finishing tasks, the type and quantity of finishing equipment, etc. In short, the collection function 236 obtains a comprehensive set of production data 238 regarding all jobs produced by the print service providers 22 in array 234 (those to which the identifier manager 200 has access).

In one example, the collection function 236 automatically obtains this information at least partially based on a cloud-based, automated printing services management scheme, as further described later in association with at least FIG. 4. In another example, the collection function 236 automatically obtains this information via other communication channels between the print service providers 22 and the identifier service provider 85 to enable the print service providers 22 to participate in the printing service identification service offered to print buyer 24 via user interface 70 (FIG. 1B).

With further reference to FIG. 3, in one example, the comparison function 240 of identification module 230 compares the print product intent 67, 122 (FIG. 1B, 2) with the collected production data (via collection function 236) to identify: (A) a list of jobs that were successfully performed (by print service providers 22) and that match at least some of the characteristics of the print product intent 67 and/or (B) a list of print service providers 22 that successfully produced jobs that closely match the specifications of the print product intent 67.

In one example, at least some of this information in listing 242 (produced via comparison function 240) is published in candidate listing 72 at user interface 70, as shown in FIG. 1B.

Figure 4:
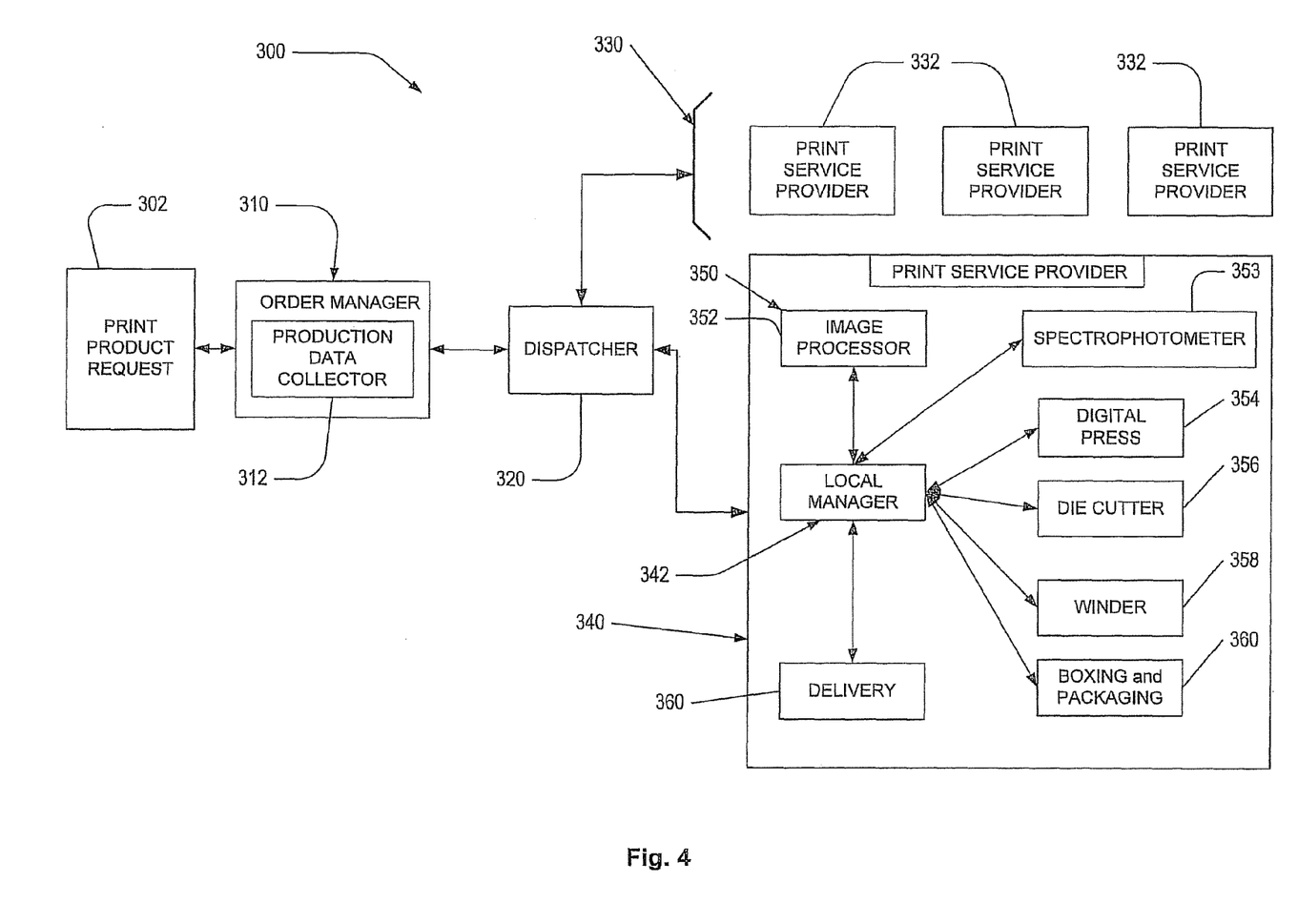
FIG. 4 is a block diagram schematically illustrating a printing system, according to one example of the present disclosure.

FIG. 4 is a block diagram of a cloud-based print service management system 300, according to one example of the present disclosure. As shown in FIG. 4, system 300 includes an order manager 310, a dispatcher 320, and a local manager 342. The order manager 310 receives the print product request 302, which in one example, is communicated as a print product intent via the Job Definition Format (JDF) protocol. The order manager 310 communicates the print product request (e.g. via a Job Definition Format (JDF) protocol) to a dispatcher 320 that communicates the print product request to one of the print service providers 332, 340 in array 330. As an example, one print service provider 340 of array 330 is illustrated in more detail in FIG. 4.

In one example, the local manager 342 forming part of system 300 also forms part of and/or is in communication with print, service provider 340.

In one example, the print service provider 340 includes an array 350 of components, such as image processor 352, spectrophotometer 353, digital press 354, die cutter 356, winder 358, boxing/packaging portion 360, and delivery portion 360. While in one example the components in array 350 are suited for producing at least some consumer packaged goods, such as labels and wrappers, it will be understood that in other examples, array 330 can include more or fewer than the components shown in FIG. 4. By omitting some components of array 350 shown in FIG. 4 and/or by include additional print production-related components, a wide variety of print products (including consumer packaged goods) can be produced.

In general terms, the local manager 342 automates the control and management of the activities of the components of the print service provider 340 to increase quality and throughput, while simultaneously enabling tracking detailed performance and quality information regarding each step of the production process. In one example, this data is tracked and communicated via the Job Definition Format (JDF) protocol, which includes the Job Messaging Format (JMF) protocol.

As further shown in FIG. 4, in one example, order manager 310 includes a production data collector 312 to collect all production data monitored via local manager 342 at print service provider 340. While such production data enables system 300 to operate effectively to provide cloud-based automated printing management services, such production data also is usable by identifier manager 80 (FIG. 1B), 120 (FIG. 2), 200 (FIG. 3), according to the examples of the present disclosure. In particular, the data collected via production data collector 312 provides at least one source of data about jobs produced by printer service providers 332, 340 that is fed into collection function 236 of identification module 230 of identifier manager 200 of FIG. 3.

It will be understood that in some examples, the production data collector 312 is not necessarily co-located with the order manager 310 but is at least in communication with at least one of dispatcher 320, order manager 310, and the local managers 342 of the respective print service providers 332, 340.

In one example, the cloud-based automated printing management services are provided via the Strategic Run Automation (SRA) scheme available from the Hewlett-Packard Company of Corvallis, Oreg.

In one example, via collection function 236 (such as via production data collector 312 in FIG. 4) the production data is collected automatically without the identifier service provider 85 directly communicating with the print service providers 22 regarding the details of the ongoing automated collection of data.

Figure 5:
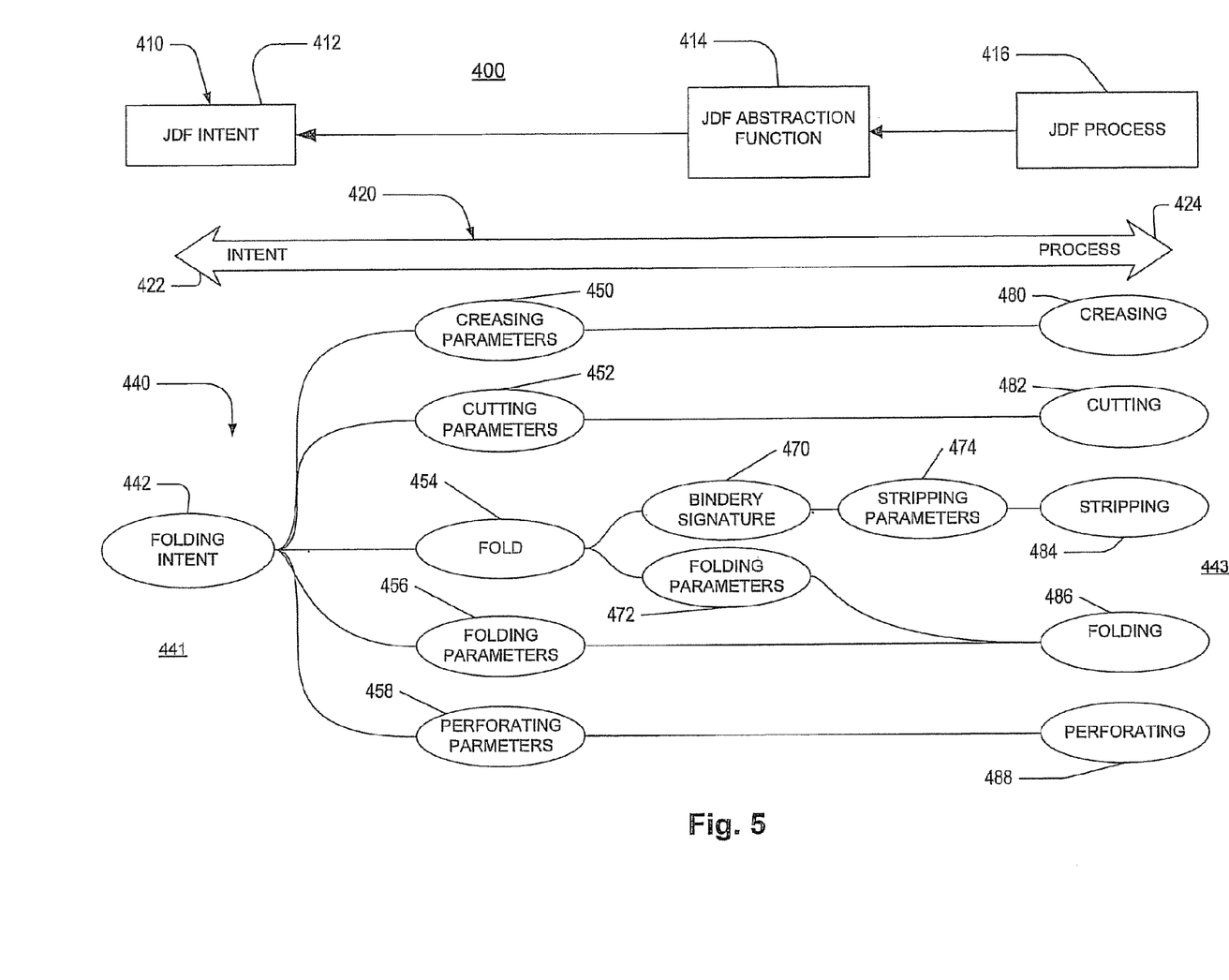
FIG. 5 is a diagram schematically illustrating a printing-related abstraction process, according to one example of the present disclosure.

FIG. 5 is a diagram 400 schematically illustrating a Job Definition Format (JDF) abstraction process, according an example of the present disclosure. As shown in FIG. 5, in one aspect diagram 400 provides one example of a pathway of 410 of taking a Job Definition Format (JDF) end process 416 (obtained from a print service provider) and applying an abstraction function 414 to determine a JDF intent 412 to which the Job Definition Format (JDF) end processes would correspond. In this way, process-specific data collected from the facilities of a print service provider 22 (FIG. 1B), 340 (FIG. 4) is correlated to and translated back into a product intent model.

In one example, the abstraction function 414 forms part of and/or is in communication with collection function 236 of identifier manager 200 (FIG. 3).

In one example, the process-specific production data (a Job Definition Format (JDF) process 416) is obtained from the production data collector 312 of a cloud-based automated printing management system 300, as previously described in association with FIG. 4. In another example, the process-specific production data is obtained from each print service provider 332, 340 via other communication channels or protocols.

As further shown in FIG. 5, in another aspect of the present disclosure, diagram 400 includes a flow arrow 420 to demonstrate that an intent-process continuum exists between two opposite ends 422 and 424 such that Job Definition Format (JDF) nodes in mapping diagram 440 that are closer to end 422 of flow arrow 420 express more intent information than process information and Job Definition Format (JDF) nodes in mapping diagram 440 that are closer to end 424 of flow arrow 420 express more process information than intent information. At the extreme end 422 of flow arrow 420, solely intent information is expressed in the Job Definition Format (JDF) node 442 and at the extreme end 424 of flow arrow 420, solely process information is expressed in the Job Definition Format (JDF) nodes 480-488.

As shown in FIG. 5, in another aspect, diagram 400 includes a mapping diagram 440, according to one example of the present disclosure. Mapping diagram 440 includes a folding intent node 442 at a first end 441 and several Job Definition Format (JDF) end process nodes 480-488 at an opposite second end 443 of the mapping diagram 440.

From the production jobs data collected via collection function 236 of identifier manager 200 (FIG. 3), at least the multiple end processes 480-488 are associated with a particular print job (and performed by a particular print service provider 22). The abstraction function 414 works backwards from these Job Definition Format (JDF) end processes 480-488 to determine what intermediate JDF nodes would correspond to, and result in the, the successfully performed Job Definition Format (JDF) end processes 480-488. In some examples, information about these intermediate Job Definition Format (JDF) nodes is obtainable from the print job from which the Job Definition Format (JDF) end processes 480-488 were obtained.

In one aspect, the abstraction function 414 determines, in examining the Job Definition Format (JDF) creasing process 480, that a creasing parameters node 450 precedes the Job Definition Format (JDF) creasing process 480, and that the creasing parameters node 450 relates directly back to an initial folding intent node 442. Similarly, in another aspect, the abstraction function 414 determines, in examining the Job Definition Format (JDF) cutting process 482, that a cutting parameters node 452 precedes the JDF cutting process 482, and that the cutting parameters node 452 relates directly back to the initial folding intent node 442. In addition, in another aspect, the abstraction function 414 determines, in examining the Job Definition Format (JDF) perforating process 488, that a perforating parameters node 458 precedes the Job Definition Format (JDF) perforating process 482, and that the perforating parameters node 452 relates directly back to the initial folding intent node 442.

In one example, the abstraction function 414 determines, in examining the Job Definition Format (JDF) folding process 486, that a folding parameters node 456 precedes the Job Definition Format (JDF) folder process 486, and that the folding parameters node 456 relates directly back to the initial folding intent node 442.

The abstraction function 414 also determines, in examining the Job Definition Format (JDF) stripping process 484, that bindery signature intent 470 and stripping parameters 474 are interposed between the stripping process node 484 and the Job Definition Format (JDF) fold node 454, and that the folding node 454 relates directly back to the initial folding intent node 442. In one aspect, the fold node 454 includes both intent and process elements.

In one aspect, mapping diagram 440 represents just one part of a typical print job that was performed by a print service provider from whom production data was collected, such that in at least some examples of the present disclosure, many other Job Definition Format (JDF) end processes (such as end processes 480-488) used to execute the print job also would be abstracted backward, via the abstraction function 414, to form an intent model.

As illustrated by mapping diagram 440 in FIG. 5, by abstracting the Job Definition Format (JDF) end processes 480-488 back into intent-level information, the abstraction function 414 determines what print product intents the print service provider is capable of meeting, and therefore, via the abstraction function 414, the identifier manager 200 (FIG. 3) develops a profile of the capabilities of the print service provider as measured from the perspective of a print buyer 24.

Figure 6A:
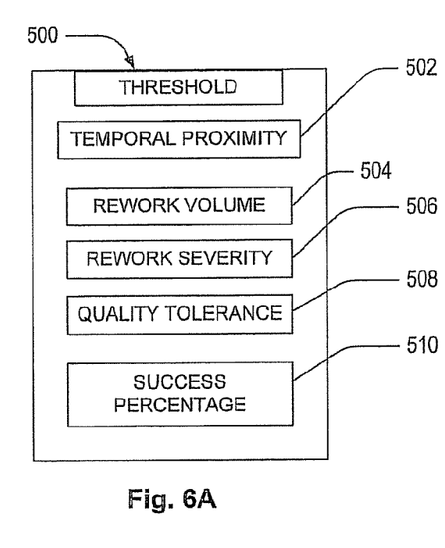
FIG. 6A is a block diagram schematically illustrating a threshold function, according to one example of the present disclosure.

In some examples, the collected data obtained via production data collector 312 includes shop floor production data to determine if the ways that the print service provider performed these processes at least meet a threshold of quality as measured in several different ways. To this end, in at least some examples of the present disclosure, identifier manager 200 (FIG. 3) includes a threshold function 500 as shown in FIG. 6A. In one example, the threshold function 500 forms part of the capabilities function 232 of identifier manager 200 (FIG. 3) while in other examples, the threshold function 500 is separate from (but in communication with) the capabilities function 232.

In addition, in one example of the present disclosure, the information and parameters forming part of threshold function 500 also would be part of the collected data obtained from the print service providers and the Job Definition Format (JDF) end processes 480-488 via production data collector 312 of system 300 in FIG. 4.

In general terms, threshold function 500 determines if a print service provider meets a quality threshold in order to qualify as a candidate to produce a print product intent requested by a print buyer 24. As shown in FIG. 6A, in one example the threshold function 500 includes a temporal proximity parameter 502, a rework volume parameter 504, a rework severity parameter 506, a quality tolerance parameter 508, and a success percentage parameter 510. The temporal proximity parameter 502 tracks how recently a particular job or Job Definition Format (JDF) process was performed. The rework volume parameter 506 tracks a volume of rework performed while the rework severity parameter 506 tracks a severity of the rework performed. The quality tolerance parameter 508 tracks the tolerance settings by which the Job Definition Format (JDF) end process (e.g. processes 480-488 in FIG. 5) was performed while the success percentage parameter 510 tracks the percentage by which the particular Job Definition Format (JDF) process(es) was successfully performed. In some examples, the threshold function 500 includes more, fewer, or other quality parameters than those shown in FIG. 6A.

Figure 6B:
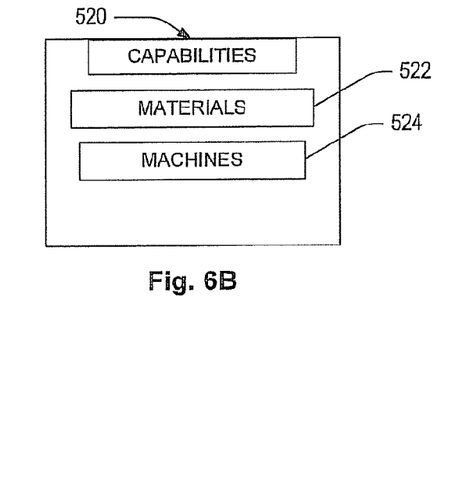
FIG. 6B is a block diagram schematically illustrating a capabilities function, according to one example of the present disclosure.

In another example, the capabilities function 232 of identifier manager 200 (FIG. 3) includes additional parameters to ensure that the capabilities of the print service provider 22 match the requested print product intent 67. As shown in FIG. 6B, in one example, a capabilities function 520 includes a materials parameter 522 and a machines parameter 524. The materials parameter 522 determines whether or not a print service provider 22 has successfully performed a Job Definition Format (JDF) end process(es) with a particular material or media. For example, the print buyer 24 may want to confirm that the print service provider has successfully performed a Job Definition Format (JDF) end process with a stretchable media. Similarly, via machines parameter 524, the print buyer 24 may want to confirm that the print service provider has successfully performed a Job Definition Format (JDF) end process with a particular brand and model of machine, such as a particular digital press or particular finishing device.

Figure 7:
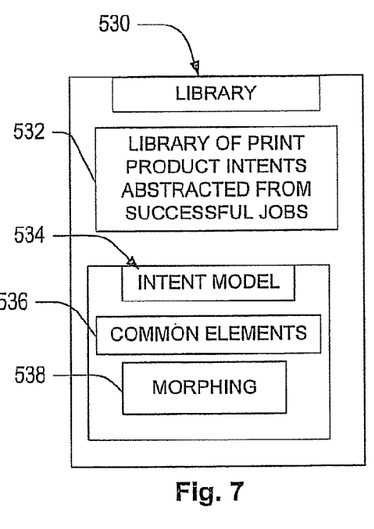
FIG. 7 is a block diagram schematically illustrating a library function, according to one example of the present disclosure.

FIG. 7 is a block diagram schematically illustrating a library function 530, according to an example of the present disclosure. In some examples, library function 530 forms part of identifier manager 200 (FIG. 3). In one example, library function 530 works to build a library 532 of intent models based on the Job Definition Format (JDF) intent models abstracted from Job Definition Format (JDF) processes that were successfully performed. Accordingly, when identifier manager 200 receives a requested print product intent, the identifier manager 200 already has a set of intent models to which the print product intent can be compared.

In another example, the library function 530 also includes an intent model function 534 that builds intent models according to a common elements parameter 536 and a morphing parameter 538. Via the common elements parameter 536, the intent model function 534 compares an existing intent model in library 532 to a new intent request to determine if the new intent request can be fulfilled with an existing intent model. This comparison involves looking to see what common elements exist between the intent model and the new intent request, if the new intent request has the same elements or fewer common elements than the intent model, then the intent model can be used to identify matching print service providers and to perform the print product intent request.

On the other hand, if the new intent request has additional elements not found in the intent model, then via morphing parameter 538 of intent model function 534, a new intent model is built in which the job (or intent request) becomes the new intent model. To the extent that some common elements exist between the intent request and the existing intent model, those common elements from the existing intent model are used as a base to form the new intent model by adding the new elements from the intent request.

In this way, morphing parameter 538 helps to automatically expand the library 532 in an incremental manner as more intent requests are received and as more intent models are built via abstracting Job Definition Format (JDF) processes for each completed job.

Figure 8:
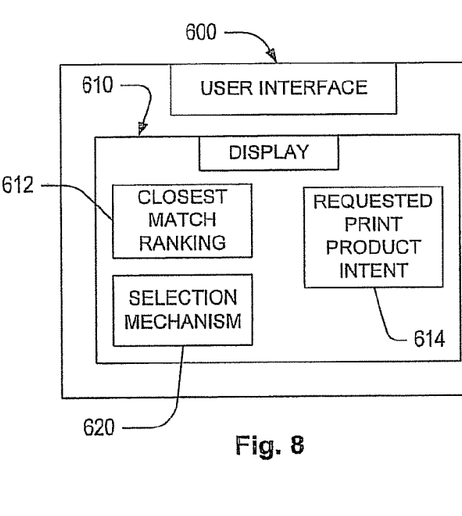
FIG. 8 is a block diagram of a user interface, according to an example of the present disclosure.

FIG. 8 is a block diagram schematically illustrating a user interface 600, according to an example of the present disclosure. In one example, user interface 600 comprises at least substantially the same features and attributes as user interface 70 and/or reporting module 250, as previously described in association with FIGS. 1B and 3, respectively. As shown in FIG. 8, in general terms, user interface 600 includes a display module 610 to display information to enable print buyer 24 to select a print service provider 22 based on the output of the identification manager 200 (FIG. 3), such as the listing 252 (FIG. 3) or the candidate listing 72 (FIG. 1B).

As shown in FIG. 8, in one example the display module 610 includes a ranking function 612 to display a ranking of the intent models (e.g., the intent models abstracted from Job Definition Format (JDF) processes of actual print jobs) that are the closest match to the specifications of the print product intent 614 (like print product intent in FIG. 11) requested by the print buyer 24. Via a selection mechanism 620 in the display module, the print buyer 24 is able to select at least one of the ranked intent models as candidates. Because each intent model is associated with a print service provider that successfully produced a print job (or successfully completed a Job Definition Format process), by selecting an intent model from the ranking, the print buyer 24 is effectively selecting a particular print service provider 22 as a candidate to produce their requested print product intent.

Figure 9:
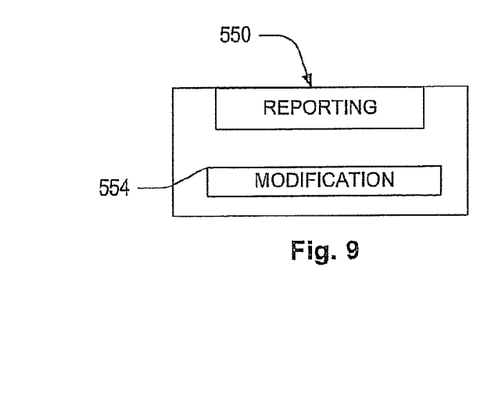
FIG. 9 is a block diagram of a reporting module, according to an example of the present disclosure.

In one example, a reporting module 550, such as reporting module 250 in the identification manager 200 in FIG. 3, includes additional reporting features that can be displayed in display module 610 of user interface 600. In one example according to the present disclosure, as shown in FIG. 9, a reporting module 550 includes a modification function 554.

The modification function 554 indicates which ways a print product intent could be modified to more closely match or exactly match one of the intent models listed in the candidate listing 72 in user interface 70 of FIG. 1B (or listed via ranking function 612 of user interface 600 in FIG. 8). In this way, a print buyer 24 could choose to modify their request (via the print product intent 67 in FIG. 1B or print product intent 614 in FIG. 8) to ensure greater compatibility of their print product intent with the proven capabilities of the identified print service provider, which are represented via the ranked intent models.

Figure 10:
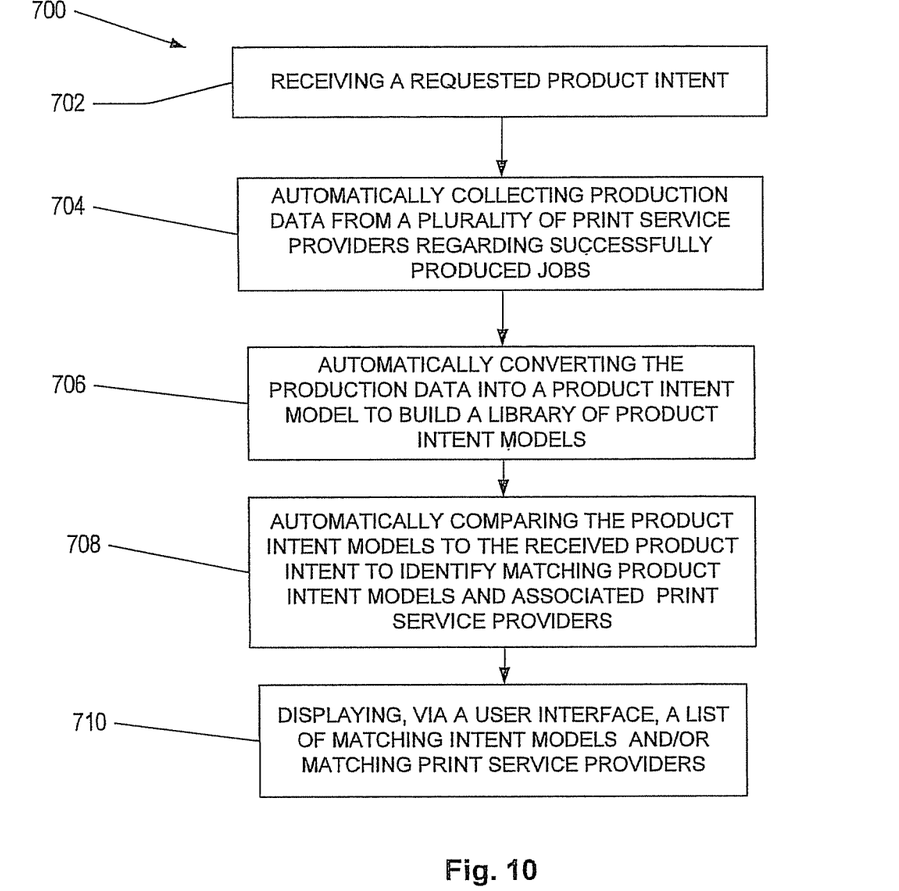
FIG. 10 is a flow diagram of a method of identifying a print service provider, according to an example of the present disclosure.

FIG. 10 is a flow diagram schematically illustrating a method 700 of identifying a print service provider, according to an example of the present disclosure. In one example, method 700 is performed according to the components, modules, and/or functions of the systems and processes, as previously described in association with FIGS. 1-9. In another example, method 700 is performed via at least some other components, modules, functions, and systems.

As shown in FIG. 10, at 702 method 700 includes receiving a requested product intent while at 704, production data is automatically collected from a plurality of print service providers regarding successfully produced jobs. At 706, method 700 includes automatically converting the production jobs data into an intent model to build a library of intent models. The intent models are automatically compared to the print product intent, as shown at 708, to identify matching intent models and a respective one of the print service providers that is associated with each matching intent model. At 710, via a user interface, a list of candidates is displayed. In some examples, the list is organized by a ranking of matching intent models while in other examples, the list is organized by matching print service providers. In either case, via the listing, the print buyer will be able to select a print service provider to produce their print product intent.

In one example, method 700 is performed via expressing the print product intent, production data, and the intent model via Job Definition Format (JDF) protocol.

Upon a print buyer submitting a request for bids to produce a print product via a user interface, at least some examples of the present disclosure automatically identify and display, via the user interface, a list of print service providers that are well suited to produce the requested print product. The print buyer then selects one of the print service providers to perform their print job according to the submitted print product request. In this way, print buyers are quickly and efficiently matched with print service providers that are competent to produce the requested print products, thereby enabling the print buyers to bypass the cumbersome traditional manner of approaching different printing firms regarding whether they can handle a particular job and the inefficient and costly way in which the print buyer is forced to evaluate the particular printing firms. Accordingly, the print buyer is freed to efficiently and effectively exploit the dynamic variety of printing services available, including digital printing services.

Although specific examples have been illustrated and described herein, it will be appreciated by those of ordinary skill in the art that a variety of alternate and/or equivalent implementations may be substituted for the specific examples shown and described without departing from the scope of the present disclosure. This application is intended to cover any adaptations or variations of the specific examples discussed herein.

What is claimed is:

1. A system for identifying a print service provider comprising:
   a non-volatile memory to store, and a processing resource to execute, machine readable instructions to cause:
      an input module to receive a requested print product intent;
      an identification module including:
         a threshold function to determine eligible print service providers based, at least, on a success percentage parameter regarding a percentage of successfully produced print products, wherein the success percentage parameter includes at least one of a rework volume parameter and a rework severity parameter;
         a capabilities function to automatically determine the capabilities of each of a plurality of the eligible print service providers and to automatically collect, via a collection function, production job data regarding a plurality of the successfully produced print products; and
         a comparison function to automatically compare the collected production job data to the requested print product intent to identify matching eligible print service providers capable of producing the requested print product; and
      a reporting module to report the matching eligible print service providers.

2. The system of claim 1, wherein the input module expresses the requested print product as a requested Job Definition Format product intent and wherein the identification module expresses at least some of the collected production job data as a corresponding plurality of Job Definition Format processes.

3. The system of claim 2, wherein the identification module includes an abstraction function to convert the plurality of Job Definition Format processes into a corresponding plurality of translated Job Definition Format product intent models and wherein the comparison function compares the abstracted Job Definition Format product intent models to a requested Job Definition Format product intent.

4. The system of claim 3, wherein conversion of the Job Definition Format processes, via the abstraction function, includes mapping at least one parameter and at least one resource of each Job Definition Format process to the Job Definition Format product intent models.

5. The system of claim 3, wherein the abstraction function includes a library function to build a library of Job Definition Format product intent models based on successfully produced, actual print products, and
   wherein the library function includes a model parameter to build the intent models based on at least:
      common elements among different Job Definition Format product intent models in the library; and
      whether the requested product intent includes a greater or lower quantity of elements than the Job Definition Format product intent models in the library.

6. The system of claim 1, wherein the reporting module indicates at least one of: a designation of which respective eligible print service providers have capabilities that most closely match the requested print product intent; and
   a listing of potential modifications to the requested print product intent to match the capabilities of a respective one of the eligible print service providers.

7. The system of claim 1, wherein the identification module is in communication with the input module to categorize the requested print product intent into a class of a plurality of classes of print products, wherein each class of print products corresponds to at least one Job Definition Format product intent model.

8. The system of claim 1, wherein the capabilities include a production machine that a respective eligible print service provider has actually used in the successfully produced, actual print products.

9. The system of claim 1, the threshold function to determine eligible print service providers based, in association with the success percentage parameter, on at least one of a temporal proximity parameter and a quality tolerance parameter.

10. The system of claim 1, wherein the capabilities include a material that a respective eligible print service provider has actually used in the successfully produced, actual print products.

11. A non-transitory computer readable medium storing machine readable instructions to perform a method of identifying a print service provider, the method to:
receive a Job Definition Format product intent;
automatically collect Job Definition Format production data from a plurality of print service providers regarding successfully produced print jobs according to actual production data and according to a print job rework parameter associated with each respective print service provider;
automatically convert the Job Definition Format production data into a Job Definition Format intent model to build a library of Job Definition Format intent models;
automatically compare the Job Definition Format intent models to the product intent to identify matching Job Definition Format intent models and associated respective service providers; and
display, via a user interface, a list of candidates from the print service providers associated with a respective one of the matching Job Definition Format models.

12. The computer readable medium of claim 11, the automatically converting to:
identify from the Job Definition Format production data at least one Job Definition Format end process; and
re-conduct the at least one Job Definition Format end process, via at least one resource and at least one parameter, to the Job Definition Format intent model.

13. The computer readable medium of claim 12, the displaying to:
display, via the user interface, a ranking of the candidate print service providers in order of how closely the associated Job Definition Format intent model matches the received Job Definition Format product intent.

14. The computer readable medium of claim 11, wherein the rework parameter is associated with a success percentage parameter.

15. The computer readable medium of claim 14, wherein the rework parameter includes at least one of a rework volume parameter and a rework severity parameter.

16. A print provider identifier system comprising:
an input module to receive a requested print product intent;
an identifier manager including:
a matching function to produce a candidate list of successfully performed, actual print jobs pertinent to the print product intent, wherein the list includes an eligible print service provider associated with each successfully performed, actual print job and wherein each listed, successfully performed, actual print job is based on production data collected from the respective eligible print service providers;
a threshold function to determine an eligibility of the respective print service providers for the candidate list based, at least, on a success percentage parameter regarding a percentage by which the print service provider successfully performs the actual print jobs, wherein the threshold function to determine the candidate list based, in association with the success percentage parameter, on at least one of a rework volume parameter and a rework severity parameter; and
a ranking function to provide a ranking of which successfully performed print jobs most closely match the print product intent; and
a user interface including:
a display module to display the ranking and the requested print product intent; and
a selection mechanism to enable selection, via the display module, of at least one of the ranked successfully performed, actual print jobs.

17. The user interface of claim 16, wherein the identifier manager includes:
a collection function to collect, automatically from the print service providers, the production data regarding each of the successfully performed, actual print jobs, wherein the production data includes Job Description Format production data; and
an abstraction function to automatically translate the Job Definition Format production data, based on each Job Definition Format process of the successfully performed, actual print jobs, into Job Definition Format intent models; and
a comparison function to automatically compare the Job Description Format intent models to the requested print product intent to identify the matching successfully performed, actual print jobs.

18. The user interface of claim 16, wherein the user interface includes: a modification function to report, via the display module, at least one proposed modification to the requested print product intent to cause a better match of the requested print product intent to the respective successively performed, actual print jobs in the candidate list.

19. The system of claim 16, the threshold function to determine the candidate list based, in association with the success percentage parameter, on at least one of a quality tolerance parameter and a success percentage parameter.

* * * * *